April 4, 1967          L. H. MORIN          3,312,767
METHOD OF PRODUCING A TRAVELER HAVING A WEAR RESISTANT INSERT
Filed Aug. 22, 1962
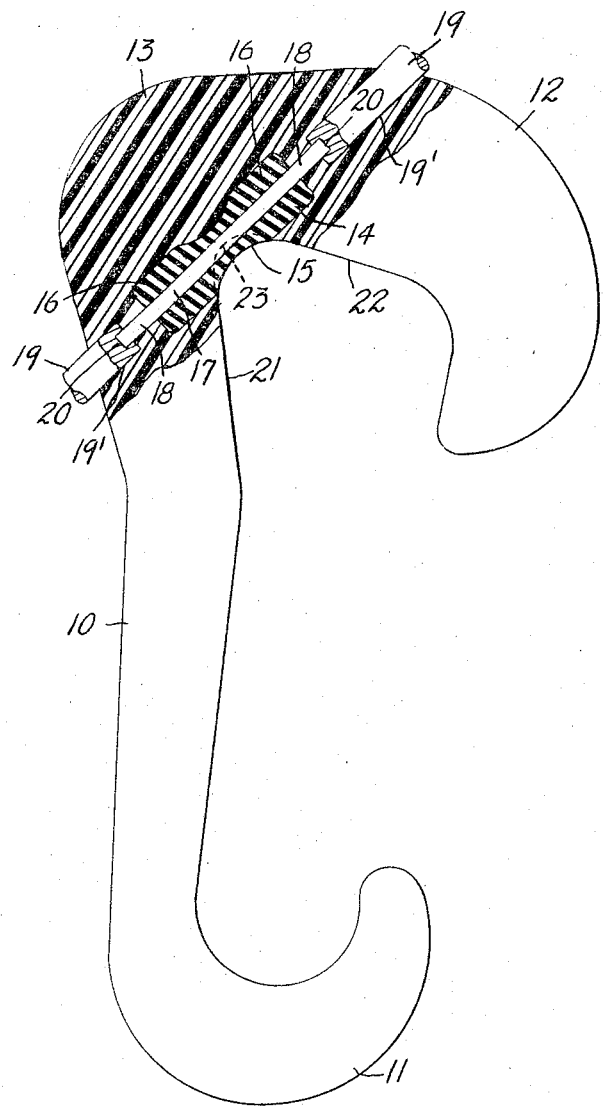
INVENTOR.
LOUIS H. MORIN
BY
*Howard C. Thompson*
ATTORNEY

United States Patent Office 3,312,767
Patented Apr. 4, 1967

3,312,767
METHOD OF PRODUCING A TRAVELER HAVING A WEAR RESISTANT INSERT
Louis H. Morin, Bronx, N.Y., assignor to Coats & Clark Inc., New York, N.Y., a corporation of Delaware
Filed Aug. 22, 1962, Ser. No. 218,732
5 Claims. (Cl. 264—254)

This invention relates to travelers and the method of producing the same, whereby a wear resistant element of thermosetting material of predetermined contour is pre-molded on a reinforcing wire and then the plastic traveler is molded upon the insert in a manner to expose at least part of the wear resistant element in the large hook end portion of the traveler.

The novel features of the invention will be best understood from the following description, when taken together with the accompanying drawing, in which certain embodiments of the invention are disclosed and, in which, the separate parts are designated by suitable reference characters and, in which, the drawing illustrates an enlarged side view of a traveler made according to my invention, with part of the construction in section in diagrammatically illustrating the method of producing the traveler with a wear resistant element therein.

In the accompanying drawing, I have illustrated one adaptation of a traveler and a method of producing the same. In the drawing, 10 represents the shank of the traveler having a small hook end 11 and a large hook end 12 joining the shank in a rounded portion, as at 13. The body of the traveler is formed from molded plastic material, as indicated by the sectioned portion thereof, and any suitable type of material can be employed such, for example, as nylon, Delrin or the like.

At 14 I have shown a more or less hourglass form of wear resistant element by virtue of the rounded recessed central portion 15 and the extended larger diameter ends 16. The recessed portion 15 forms at the inner portion of the rounded part 13 of the traveler, where it is exposed, the desired wear resistant surface in the resulting traveler.

In carrying out my method, the element 14 is pre-molded upon a wire or similar core 17, with the ends 18 of the core extending beyond the ends 16 of the element 14, as clearly illustrated, so that, in formation of the resulting traveler, the insert element 14 can be positioned in the molds forming the traveler proper by the use of suppporting pins 19, recessed, as seen at 20, to receive the ends 18 in definite location of the insert element 14 in the molds, preparatory to forming the traveler upon the insert 14, in the manner illustrated, so that surfaces 21 and 22 of the hook end 12 of the traveler will properly aline and register with the surface of the recess 15 for exposure of the resistant element in the manner clearly shown. It will be understood that, in the present illustration, the pins 19, which are actually core pins, are in the position they assume in the mold which forms the traveler and these pins 19 are withdrawn from the traveler in the operation of removing the traveler from the cavity of the molds forming the same and this removal will leave in the traveler apertures, as at 19'.

It will, further, be apparent that the contour of the insert element 14 definitely positions the element in the traveler body and that the surface of the recessed portion 15 of the element is exposed to sides of the rounded portion 13, as diagrammatically illustrated, in part, by the dotted line 23. In the construction illustrated, the element 14 is formed of thermosetting rubber, or rubber compositions, synthetic or otherwise. However, any type and kind of thermosetting plastics providing wear resistant properties can be employed.

Having fully described my invention, what I claim as new and desire to secure by Letters Patent is:

1. The method of forming travelers of the character defined, which consists in pre-molding a thermosetting plastic wear resistant element on a metal wire reinforcement including ends protruding beyond ends of said element, then utilizing the protruding ends of said wire for positioning the insert element in the cavity of the mold for forming a hook end portion on the resulting traveler, and then molding the hook end of the traveler upon the insert in a manner to embed the end portions of said wire reinforcement in said hook end portion of said traveler below the surface thereof and to expose part of the surfaces of the insert on the inner surface of the hook end of the traveler in providing on the hook end of the traveler exposed wear resistant surfaces.

2. A method as defined in claim 1, wherein core pins are utilized to engage the protruding ends of the wire in positioning the element in the aforesaid positioning of the element, and withdrawing said core pins in removing the formed traveler from the molds.

3. A method as defined in claim 1, wherein said element is formed of hard rubber.

4. A method as defined in claim 1, wherein the exposed wear resistant surface of said element constitutes a rounded recessed surface substantially centrally of said element.

5. The method of forming travelers of the character defined, which consists in pre-molding a thermosetting plastic wear resistant element on a one-piece continuous wire reinforcing means including ends protruding beyond ends of said element, then utilizing the protruding ends of said wire for positioning the insert element in the cavity of the mold for forming a hook end portion on the resulting traveler, and then molding the hook end of the traveler upon the insert in a manner to embed the end portions of said wire reinforcement in said hook end portion of said traveler below the surface thereof and to expose part of the surfaces of the insert on the inner surface of the hook end of the traveler in providing on the hook end of the traveler exposed wear resistant surfaces.

References Cited by the Examiner

UNITED STATES PATENTS

| | | | |
|---|---|---|---|
| 2,683,287 | 7/1954 | Cochran et al. | 18—38 |
| 2,908,941 | 10/1959 | Sabo et al. | 264—328 |
| 2,926,485 | 3/1960 | Morin. | |
| 2,934,792 | 5/1960 | Harrington | 18—59 |
| 2,942,407 | 6/1960 | Morin | 57—125 |
| 2,961,826 | 11/1960 | Morin | 57—125 |
| 2,966,026 | 12/1960 | Morin | 18—42 |
| 2,973,556 | 3/1961 | Morin | 264—328 |
| 2,999,276 | 9/1961 | Morin | 18—38 |

ROBERT F. WHITE, Primary Examiner.

RUSSEL C. MADER, J. PETRAKES, G. AUVILLE,
Assistant Examiners.